No. 774,737. PATENTED NOV. 15, 1904.
F. H. BORDEN.
FRUIT GATHERER.
APPLICATION FILED AUG. 30, 1902.
NO MODEL.
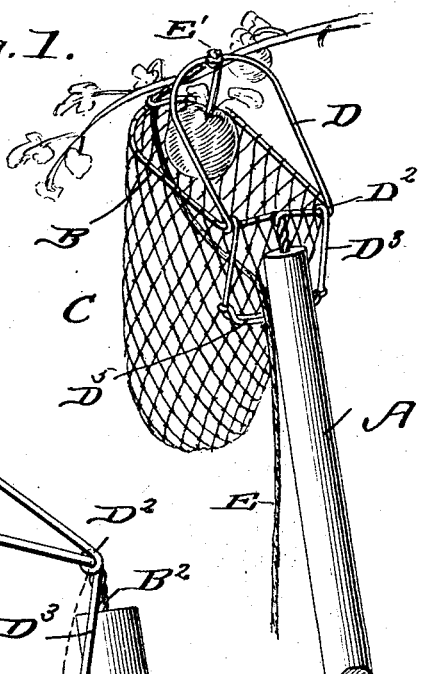
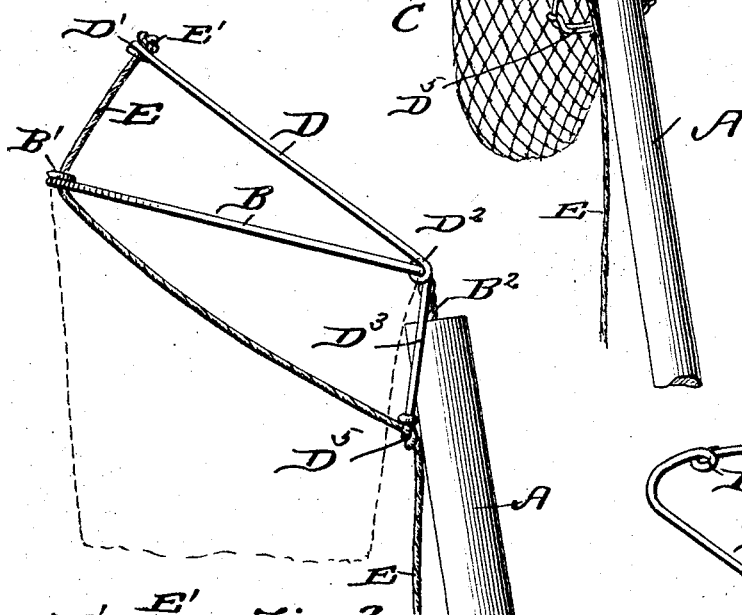
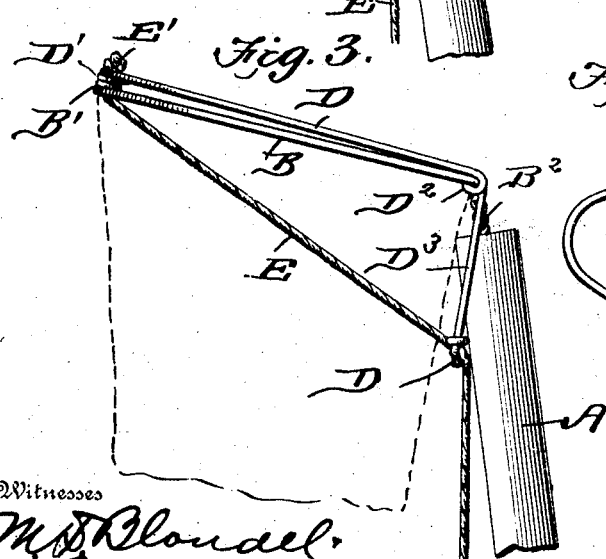
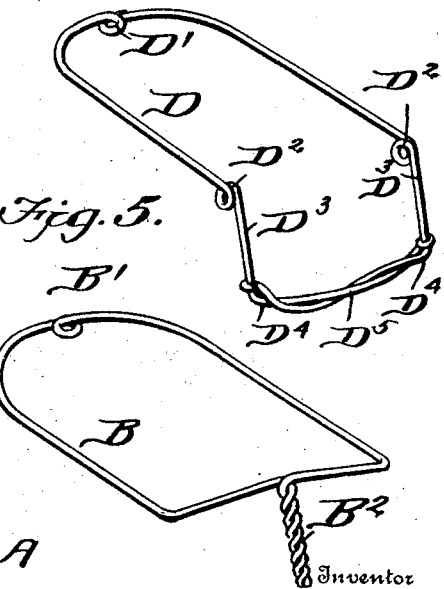
Witnesses
Inventor
F. H. Borden.
By
Attorneys No. 774,737. Patented November 15, 1904.

UNITED STATES PATENT OFFICE.

FIRMAN H. BORDEN, OF VINCENNES, INDIANA.

FRUIT-GATHERER.

SPECIFICATION forming part of Letters Patent No. 774,737, dated November 15, 1904.

Application filed August 30, 1902. Serial No. 121,654. (No model.)

*To all whom it may concern:*

Be it known that I, FIRMAN H. BORDEN, a citizen of the United States, residing at Vincennes, in the county of Knox and State of Indiana, have invented a new and useful Fruit-Gatherer, of which the following is a specification.

This invention relates generally to fruit-gatherers, and more particularly to that class thereof in which a net is arranged upon the upper end of the pole, which pole is also provided with means for removing the fruit from the tree and directing the same into the box or net.

The object of my invention is to provide a fruit-gatherer embodying this characteristic and which shall be exceedingly cheap in construction and simple and efficient in operation and which will not injure the fruit while being gathered.

With this object in view the invention consists in the novel features of construction, combination, and arrangement, all of which will be fully described hereinafter and pointed out in the claims.

In the drawings forming a part of this specification, Figure 1 is a perspective view of the fruit-gatherer constructed in accordance with my invention and showing the practical operation thereof. Fig. 2 is a side elevation of the device, the net being omitted in order to more clearly illustrate the other features of the device, the gatherer being shown in its normal position. Fig. 3 is a similar view showing the positions the parts assume during the pulling operation. Fig. 4 is a detail perspective view of the pulling-frame, and Fig. 5 is a detail perspective view of the net-carrying frame.

In carrying out my invention I employ a pole A, which may be any length desired, and at the upper end of said pole I arrange the frame B, to which is attached the net or box C, which is intended to catch the fruit gathered. The frame B is preferably constructed from a single piece of stout rod iron or wire and essentially rectangular in form, being bent to provide an eye B', and the ends are twisted together, as shown at B², and inserted in the upper end of the pole A. The pulling-frame D is pivotally connected to the frame B and is also preferably constructed from a single piece of rod iron or wire and is bent centrally upon pins to provide an eye D' at the rear end and eyes D² at the sides, which eyes serve as a binding connection for the pulling-frame upon the fixed frame B. The ends of the rod or wire are then bent downwardly, as shown at D³, and then the ends are bent horizontally in opposite directions, as shown at D⁴, said ends crossing each other at D⁵ and twisted around the opposite downwardly-extending portion D³, the double cross portion resting upon the rear side of the pole adjacent to the upper end thereof.

A cord or rope E is passed through the eye D' and knotted, as shown at E'. This cord or rope also passes through the eye B' and then over the double cross portion of the pulling-frame D.

In operation the net or box is supported beneath the fruit to be gathered, and by pulling down upon the cord or rope the rear portion of the frame D is brought into contact with the stem of the fruit, and by giving a sliding jerk the fruit is separated from the limb and caught in the net or box. The cord or rope is then immediately released, and the pulling-frame will slip back to its normal position ready for another operation, which operation can be repeated until the net or box is filled. It will thus be seen that I provide an exceedingly cheap, simple, and efficient construction of fruit-gatherer.

Having thus fully described my invention, what I claim as new, and desire to secure by Letters Patent of the United States, is—

1. A fruit-gatherer comprising a pole, a skeleton frame secured thereto, a spring-frame consisting of two parts lying in intersecting planes having eyes at the junction of its parts, through which a member of the first-named frame loosely passes, one part of the spring-frame engaging the pole, and a cable secured to the free end of said spring-frame as set forth.

2. A fruit-gatherer, comprising a poe, a skeleton frame secured thereto and provided with an eye at its end, a spring-frame consisting of two parts lying in intersecting planes having eyes at the junction of its parts through which a member of the first-named frame loosely passes and an eye at the end of one of the parts, one part of the spring-frame engaging the pole, and a cable secured to the eye of the spring-frame and passing loosely through the eye of the other frame, as set forth.

3. A fruit-gatherer comprising a pole, a frame secured to the pole and projecting therefrom, said frame being provided with an eye at its free end, a spring-frame consisting of two parts lying in intersecting planes pivoted to the fixed frame and having one part engaging the pole, the said frame being provided with an eye on the other part, and a cord secured to the eye of the spring-frame and passing loosely through the eye of the fixed frame as set forth.

FIRMAN H. BORDEN.

Witnesses:
ARTHUR LONG,
WM. H. LONG.